Aug. 14, 1934.  J. K. DOUGLAS  1,970,131
RELIEF VALVE
Filed Nov. 18, 1929
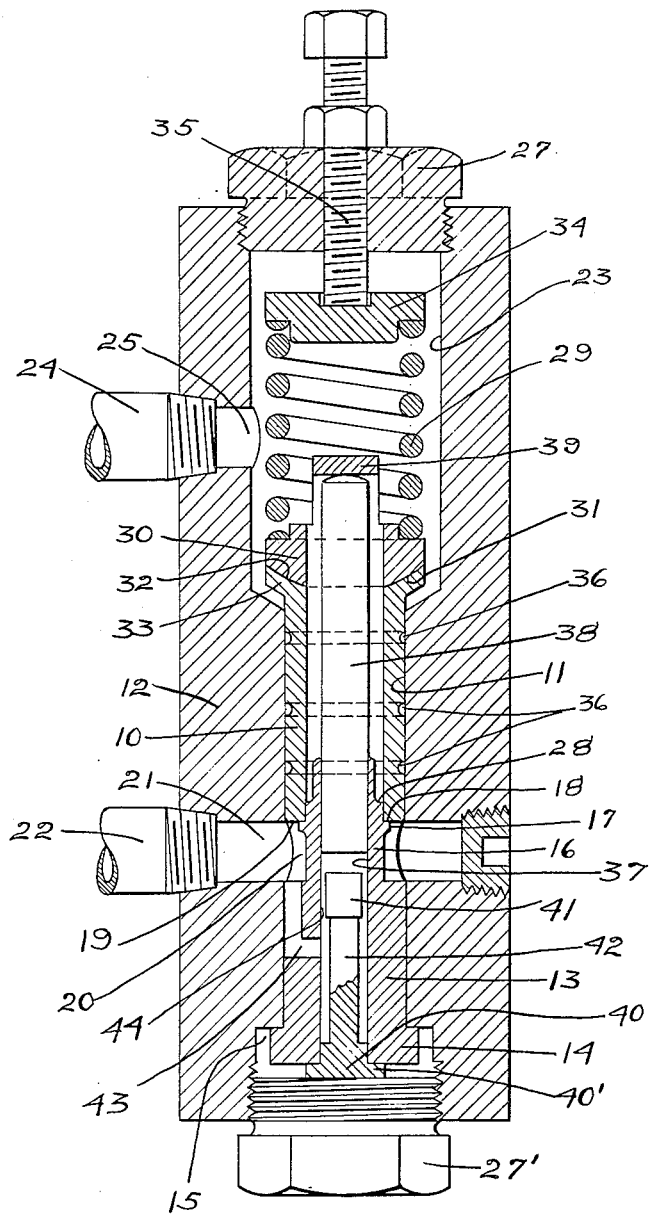
Inventor
JAMES K. DOUGLAS.
By Ralph W. Brown,
Attorney Patented Aug. 14, 1934

1,970,131

UNITED STATES PATENT OFFICE 1,970,131

RELIEF VALVE

James K. Douglas, Milwaukee, Wis., assignor to The Oilgear Company, Milwaukee, Wis., a corporation of Wisconsin Application November 18, 1929, Serial No. 407,937

6 Claims. (Cl. 137—53)

This invention relates to pressure relief valves for hydraulic circuits and particularly for high pressure hydraulic power transmissions.

Pressure relief valves heretofore designed and employed in high pressure hydraulic systems frequently shriek, howl, and chatter causing much inconvenience and annoyance and also causing premature wear on the active parts and breakage of valve springs. This peculiar phenomenon I attribute to the very limited compressibility, expansibility, and resiliency of the liquid medium, usually oil, in the system which results in a momentary drop in pressure at the valve at the instant of valve opening thus inducing a closing movement of the valve with a consequent instantaneous rise in pressure at the valve inducing an opening movement thereof. These fluctuations in pressure at the valve occur in rapid succession ordinarily at a rate dependent upon the weight of the movable valve element causing this element to vibrate at a rate in tune with its natural vibration frequency. This produces the shriek or howl. The chatter or low frequency vibration of the movable valve element is probably the result of pulsations in the system induced by the pump or otherwise.

One object of the present invention is the provision of a pressure relief valve for hydraulic systems which will be proof against shrieking, howling, and chatter.

Other more specific objects and advantages will appear from the following description of an illustrative embodiment of the present invention.

The single figure of the accompanying drawing is a sectional view of a pressure relief valve constructed in accordance with the present invention.

The valve shown comprises a cylindrical sleeve 10 closely fitted for lengthwise movement in a bore 11 formed in a block or housing 12. In this instance the lower end of the bore 11 is closed by a cylindrical bushing 13 fitted therein and having an enlarged head 14 formed at the lower end thereof and seated against the base of a socket 15 formed in the block adjacent the lower end of the bore. The upper end of the bushing 13 is reduced to form a cylindrical extension 16 having a close sliding fit within the lower end of the sleeve 10 and having a shoulder 17 formed thereon to provide an annular valve seat 18 for receiving the inner portion of the annular end face 19 of the sleeve. The annular chamber 20, surrounding the reduced portion 16 of the bushing, is exposed to hydraulic pressure through a transverse passage 21 in the block which communicates with the pressure pipe 22. An outlet chamber 23 formed in the block above and adjacent the upper end of the bore 11 communicates with an exhaust pipe 24 through a transverse passage 25 in the block. The chamber 23 is closed by a screw plug 27. The upper extremity of the cylindrical extension 16 is further reduced to form a shoulder 28, spaced above the shoulder 17, so that when the sleeve 10 is elevated sufficiently to clear the shoulder 28 liquid may escape from chamber 20 into the sleeve.

The sleeve 10 is yieldably retained in closed position with the lower end face 19 thereof against the seat 18 by a compression spring 29 contained within the chamber 23. In this instance the spring 29 seats upon a ring 30 having a convex spherical face 31 rockably seated upon a concave spherical face 32 of the sleeve 10. The upper end of the spring 29 reacts against a follower disk 34 seated on the end of a screw 35 which is threaded in the plug 27 and by rotation of which the pressure in the spring may be regulated. The spherical bearing contact between the ring 30 and the head 33 of the sleeve insures a direct axial thrust between the spring and sleeve and thus avoids any cramping action between the sleeve and bore that might otherwise result from an unbalanced spring. The outer peripheral surface of the sleeve 10 is lubricated by slight leakage from the pressure chamber 20 so as to reduce the friction between the sleeve and bore 11 to a minimum; and in order to insure an even distribution of lubricant around the sleeve and thus avoid unbalanced hydraulic thrusts thereon, one or more annular grooves 36 are formed in the periphery thereof. Each of these grooves intercepts leakage between the sleeve and bore and distributes or redistributes the same about the sleeve.

From the foregoing it will be understood that as long as the pressure in chamber 20 remains below a predetermined maximum (as determined by the setting of screw 35) the sleeve 10 will be retained by the spring 29 in the lower position shown with the lower end face 19 thereof resting against the seat 18 and with the reduced portion 16 of the bushing 13 engaged within the lower end thereof. In this position the valve is closed and effectively sealed. This condition maintains until the pressure in chamber 20 rises sufficiently to elevate the sleeve, against the pressure of the spring, into a position clear of the shoulder 28. When this occurs liquid may escape from chamber 20 past the shoulder 28 into and through the sleeve, ring 30, chamber 23, and passage 25 to and through the exhaust pipe 24. It will thus be noted that the valve is opened and closed by a sliding movement of the sleeve 10 upon the reduced portion 16 and by the coaction of the end face 19 and shoulder 28 thereon. It has been found that a valve of the sliding type is less liable to vibrate than a valve of the type involving abutting faces movable toward and from each other to open and close the valve.

In the valve shown provision is also made for restraining the same against vibration. For this purpose the bushing 13 is longitudinally bored as at 37 to receive the lower end of a plunger 38 which bears at its upper end against a bridge piece 39 carried by the ring 30. The lower end of the bore 37 is closed by a plug 40 seated therein and removably retained by a flanged head 40' confined between the plug 27' and the end head 14 of the bushing 13. A cylindrical head 41 slightly smaller than the bore 37, and supported within the bore by a stem 42 on the plug 40 leaves only a restricted passage 44 between the upper and lower portions of the bore. A passage 43 connects the lower portion of the bore with the pressure chamber 20. The arrangement is such that the lower end of the plunger 38 is normally exposed to the pressure in chamber 20 through the passage 43 and the restricted passage 44, so that the plunger normally functions to assist in lifting the valve into open position. The restricted passage 44 however retards the flow of liquid to and from the upper end of the bore and thus limits the rate of movement of the plunger 38 in either direction. Since the plunger is not actually connected with the bridge piece 39 it does not interfere with a prompt opening movement of the valve sleeve 10 in the event of a sudden rise in pressure in chamber 20. When elevated however the plunger does check the closing movement of the sleeve 10 and thus serves to prevent vibration thereof due to the dashpot effect of the restricted passage 44. Also since the restricted passage 44 prevents the transmission of sudden fluctuations in pressure from the chamber 20 to the end of the plunger 38 the plunger is unaffected by such fluctuations and thus exercises a steadying effect upon the valve.

Various changes may be made in the embodiment of the invention hereinabove specifically described without departing from or sacrificing the advantages of the invention as defined in the appended claims.

I claim:—

1. In a pressure relief valve the combination of a housing having a pressure chamber and a bore therein, a valve comprising a sleeve reciprocable in said bore and exposed at one end to said chamber, a stationary element having a cylindrical portion slidably receivable within said sleeve and also having an external shoulder forming an end seat for said sleeve, said element being reduced to form a second shoulder normally covered by said sleeve, and means for yieldably retaining said sleeve against said seat to thereby prevent the escape of fluid from said chamber, said sleeve being movable by a predetermined pressure in said chamber to uncover said second shoulder to thereby permit the escape of fluid from said chamber through said sleeve.

2. In a pressure relief valve the combination of a housing having a pressure chamber and a bore therein, a valve comprising a sleeve reciprocable in said bore and exposed at one end to the pressure in said chamber, a stationary element having a cylindrical portion slidably receivable within said sleeve and also having an external shoulder forming an end seat for said sleeve, said element being reduced to form a second shoulder normally covered by said sleeve, a ring rockably seated against the other end of said sleeve, and a spring pressing against said ring for yieldably retaining said sleeve against said seat.

3. In a pressure relief valve the combination of a housing having a pressure chamber therein, a pressure responsive valve element exposed to the pressure in said chamber for controlling the escape of fluid therefrom, a thrust transmitting plunger loosely engaged with said valve element to permit free opening movement thereof but operable to resist a closing movement thereof, and dashpot means coacting with said plunger to retard the closing action of said valve.

4. In a pressure relief valve the combination of a housing having a pressure chamber therein, a pressure responsive valve exposed to the pressure in said chamber for controlling the escape of fluid therefrom, an auxiliary chamber, a restricted passage between said auxiliary chamber and said pressure chamber for the restricted passage of fluid to and from said auxiliary chamber, and a thrust transmitting plunger loosely engaged with said valve element and arranged in said auxiliary chamber to reciprocate therein and eject fluid therefrom through said passage during movement toward closed position of said valve element to retard the closing action thereof but permitting an unretarded opening movement thereof.

5. In a pressure relief valve the combination of a housing having a pressure chamber therein, a sleeve valve reciprocable in said housing, a member receivable into one end of said sleeve valve and cooperating therewith to control the escape of liquid in said chamber, an auxiliary chamber in said member, a restricted communication between said auxiliary chamber and said pressure chamber, and a plunger in said auxiliary chamber cooperating with said sleeve valve to prevent vibration thereof.

6. In a pressure relief valve the combination of a member having a bore and a fluid pressure port communicating therewith, a sleeve reciprocable in said bore and exposed at one end to the pressure in said port, a stationary element receivable in said end of said sleeve and having a peripheral shoulder forming a seat for said sleeve, and means for yieldably resisting movement of said sleeve from said seat, said sleeve being movable from said seat by a predetermined pressure in said port to thereby open said valve, and dashpot means for resisting the closing movement of said sleeve but ineffective to resist the opening movement thereof.

JAMES K. DOUGLAS.